DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 31, 1970

872 O.G. 1411

T872,009

POLYAMIDES

Frederick Keith, Duxbury, and Brian Arthur Mountfield, Manchester, England, assignors to Imperial Chemical Industries Limited, London, England, a corporation of Great Britain

Filed Sept. 23, 1968, Ser. No. 761,859
Int. Cl. C08g *51/56*
U.S. Cl. 260—45.75
No Drawing. 7 Pages Specification

A process for the manufacture of polyamides is disclosed wherein the polyamide is obtained by polycondensation of p- or m-xylene diamine with a dicarboxylic acid with the application of heat in the presence of a metal salt of hypophosphorous acid and removing the water of condensation. Metal salts include the metals of Groups I*a* and II*a* of the Periodic System, as for example sodium, potassium, calcium and barium hypophosphites.

Stabilizers are desirably added to the condensation mixture. Such additives include copper salts of organic carboxylic acids or an enol; halides including ammonium iodide, alkali or alkaline earth metal iodides, hexamethylenediamine hydriiodide; and aminic and phenolic antioxidants. Such polyamides, particularly in the form of filaments, possess improved color stability during thermal processing.